Figure 1:
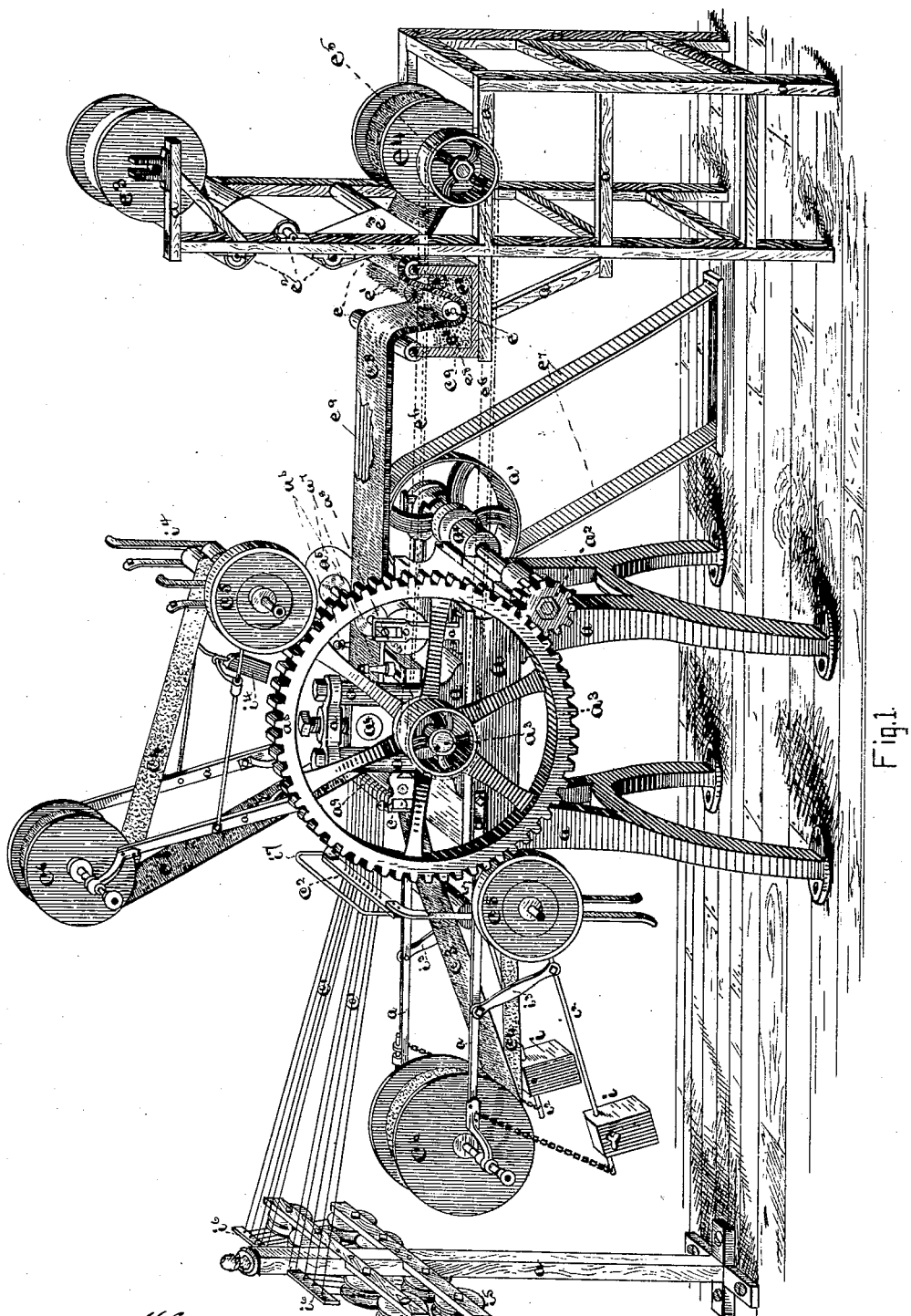

(No Model.) 4 Sheets—Sheet 1.
T. J. MAYALL.
MACHINE FOR MAKING INSULATED TELEGRAPH WIRES.
No. 243,783. Patented July 5, 1881.

(No Model.)

T. J. MAYALL.
MACHINE FOR MAKING INSULATED TELEGRAPH WIRES.

No. 243,783. Patented July 5, 1881.

4 Sheets—Sheet 2.

(No Model.)  T. J. MAYALL.  4 Sheets—Sheet 3.
MACHINE FOR MAKING INSULATED TELEGRAPH WIRES.
No. 243,783.  Patented July 5, 1881.

Witnesses.
Ch. Henghton
H C Kearney Jr.

Inventor.
Thos J Mayall (No Model.) 4 Sheets—Sheet 4.
T. J. MAYALL.
MACHINE FOR MAKING INSULATED TELEGRAPH WIRES.
No. 243,783. Patented July 5, 1881.
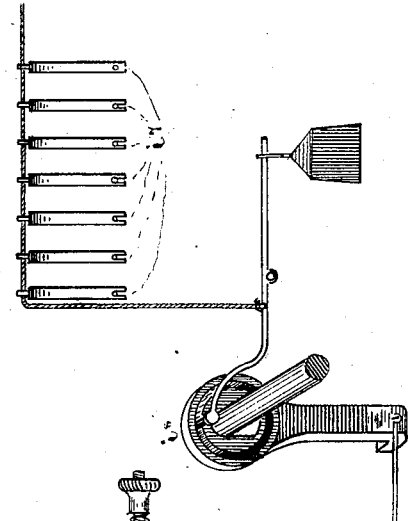
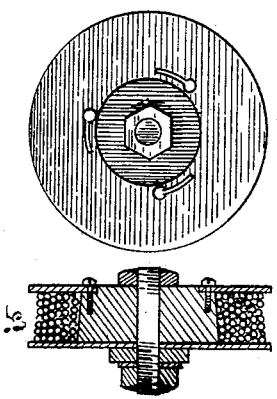
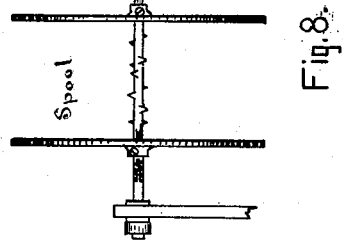
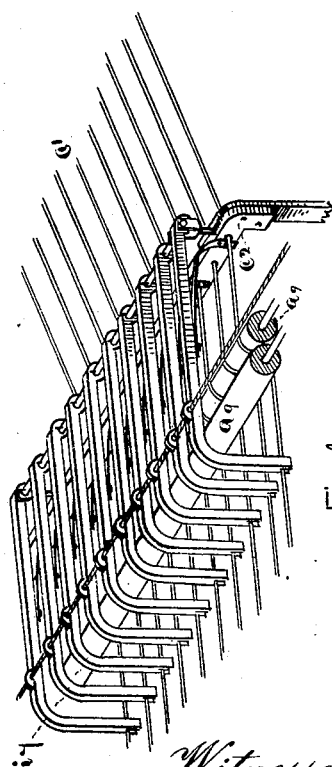
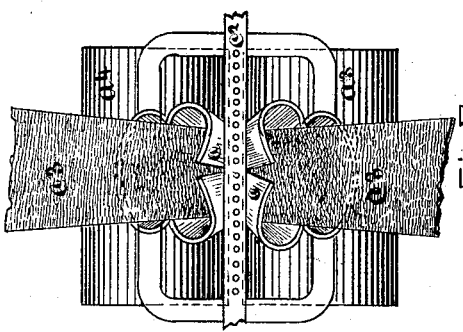
Witnesses.
Inventor.

UNITED STATES PATENT OFFICE.

THOMAS J. MAYALL, OF READING, MASSACHUSETTS.

MACHINE FOR MAKING INSULATED TELEGRAPH-WIRES.

SPECIFICATION forming part of Letters Patent No. 243,783, dated July 5, 1881.

Application filed May 7, 1881. (No model.)

*To all whom it may concern:*

Be it known that I, THOMAS J. MAYALL, of Reading, in the county of Middlesex and State of Massachusetts, have invented a new and useful machine for inclosing a gang of wires for telegraph purposes in a strap or band of insulating material, of which the following is a specification.

The strap or band in which I inclose and insulate any number of telegraph-wires from two to twenty, or even more, if occasion requires, is made of a compound of rubber and graphite, with a portion of sulphur sufficient to aid in curing or vulcanizing the compound, thoroughly commingled and blended together in a plastic mass by grinding or other suitable means. This compound is run out into sheets of one-half the thickness required for the band when finished with the wires in it. These sheets are cut into strips of the width required for the band, and the strips are cemented end to end together to make a length convenient. The strips are then covered on one side with muslin and wound up on a large spool, the use of the muslin being to prevent the strip from sticking together as it is wound up on the spool. A gang of wires are laid parallel to each other at equal distances apart, and a strip of the rubber and graphite compound laid on both sides of the wires and pressed together with the wires between them with just sufficient force to weld the two strips into one homogeneous whole band with the wires in the middle of it.

The object of the machine described below, and illustrated in the drawings annexed, is to form the band of rubber and graphite compound with the wires in the middle of it, laid at equal distances apart and parallel to each other.

Figure 2:
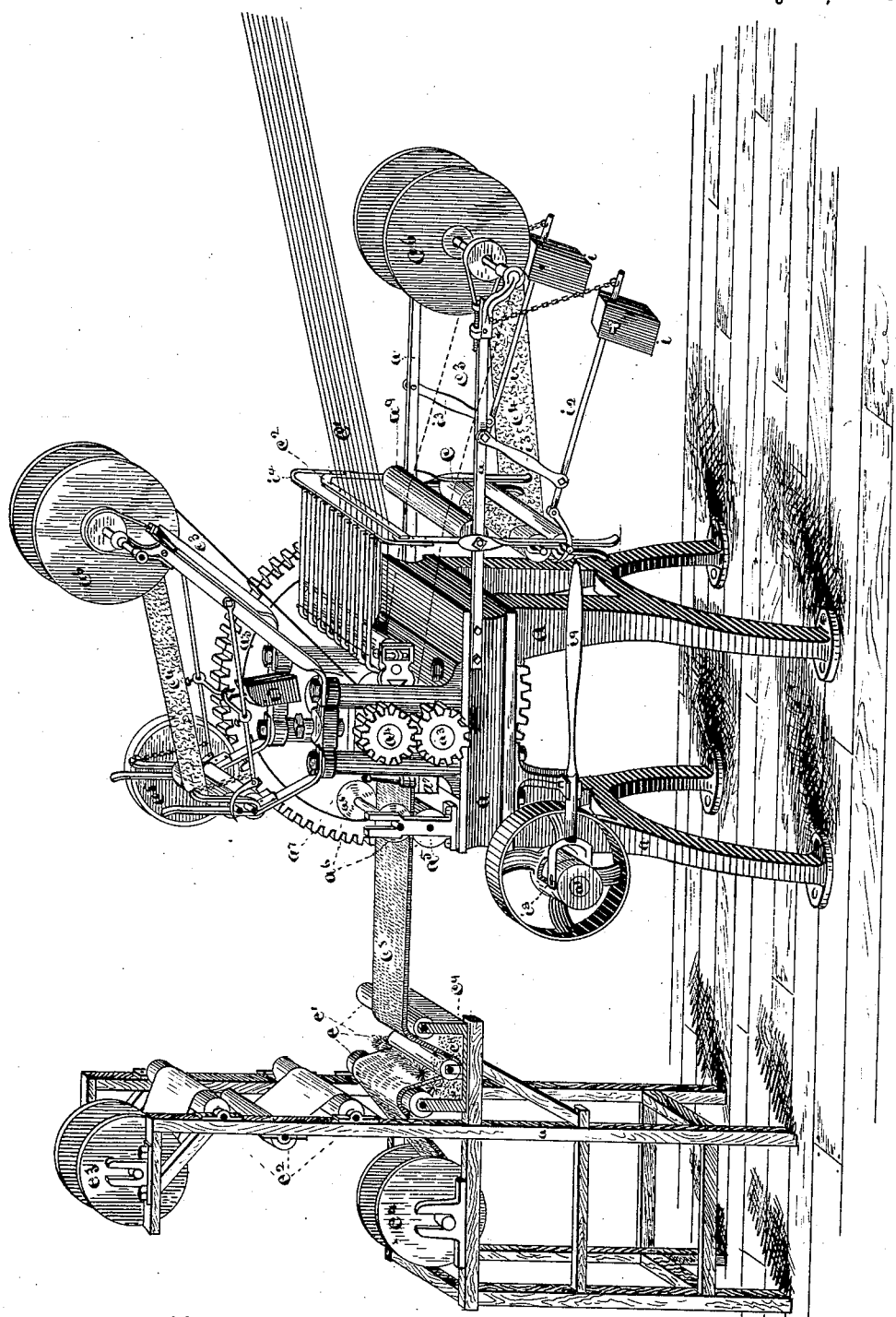
Figure 3:
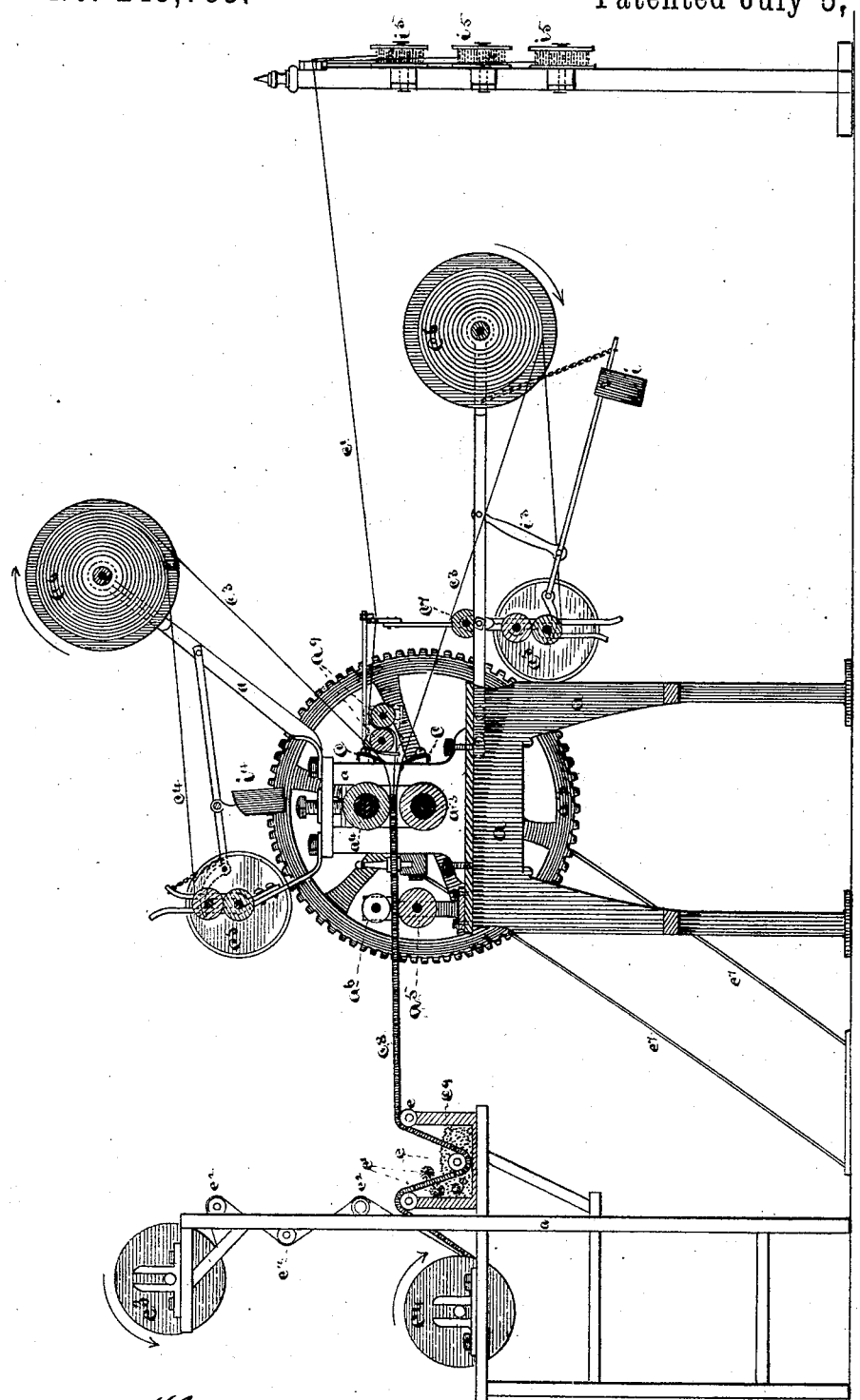

In the drawings annexed, Figure 1 is a side view, in partial perspective, of the machine. Fig. 2 is a similar view of the opposite side of the machine. Fig. 3 is a longitudinal sectional view on a line through the center of the machine. Fig. 4 shows an automatic arrangement for stopping the machine in case one of the wires is broken or gets displaced, consisting of a series of arms having one end pivoted on the frame of the machine and the other end bent downward over the rolls $a^3$, and with forked ends, each arm riding a wire. If the wire breaks, the arm is carried down by its weight and by a spring acting in the same direction, and by its descent releases a lever with a weight on it, which unships the clutch which imparts the motion of the driving-pulley $a'$ to its shaft and the gear $a^3$. Fig. 5 shows a transverse section of a spool of wire. Fig. 6 shows the end of a spool. Fig. 7 shows a side view of the pressure-rolls, a portion of the rubber compound strips, the throat through which the strips pass to the pressure-rolls, and the guide for the wires. Fig. 8 is an empty spool for the rubber-compound strip. Fig. 9 is a front view of the series of arms shown in Fig. 4, and their connection with a lever and weight which unships the clutch to stop the machine when a wire is broken or displaced.

The letters used on the drawings indicate the same parts in all the several figures.

$a$ indicates the frame-work of the machine. $a'$ is the driving-pulley and the shaft on which it is fixed. $a^2$ is a pinion on the shaft $a'$ matching into the main driving-gear of the machine. $a^3$ is the main driving-gear of the machine, set in motion by the pinion $a^2$ and moving all the working parts, and the shaft on which it is fixed, which is also the lower pressure-roller. $a^4$ is the upper pressure-roller. $a^5$ is the trimming-roller, over which the band of rubber compound passes, and on which it is cut to uniform width; $a^6$, two revolving cutters placed on a shaft the distance apart required for the width of the band, the edges on the circumference just touching, but not bearing upon the roll $a^5$, and trimming both edges of the band as it passes between them when the machine is in operation; $a^7$, two guide-pins, between which the band passes between the rolls $a^3$ and $a^4$ and the trimming-roll $a^5$, to keep the band in its proper position. $a^8$ is a pulley on the shaft of $a^3$, over which a belt passes to drive the receiving-spool; $a^9$, a pair of rolls between which the wires pass, one of which has circumferential grooves, one for each wire, to keep it in its proper relative position.

$c$ is a throat through which the wires and the two strips of rubber compound pass to the pressure-rolls $a^3$ and $a^4$; $c'$, the wires; $c^2$, a transverse bar with openings through it at equal distances apart, through which the wires pass; $c^3$, the strips of rubber and graphite compound unwinding from the spools and passing, with the wires, through the throat to the pressure-rolls $a^3$ and $a^4$; $c^4$, the strip of muslin separated from the strip of rubber and passing to the spools, on which it is wound to be removed and used again; $c^5$, the receiving-spools to take up the muslin as it is separated from the strips of rubber, and pulleys attached to and moving the spools, having a rubber face, which engages the teeth of the gear $a^3$, and take motion from it by friction. $c^5$ also indicates a binding-roll over the roll of the spool which takes up the strip of muslin shown in Fig. 3; $c^6$, spools on which the rubber-compound strip and the muslin strip are wound up together; $c^7$, a guide or supporting roll for the lower strip of rubber compound; $c^8$, the rubber-compound band, with the wires in it, after it has passed the pressure-rolls $a^3$ and $a^4$, and the trimming-roll and knives $a^5$ and $a^6$. $c^9$ is a box containing powdered talc, through which the band $c^8$ is made to pass by rolls properly arranged for the purpose, the purpose being to change the tacky or sticky condition of the surface of the rubber compound.

$e$ represents three rolls, arranged to carry the band of rubber compound and wires through mass of powdered talc in the box $c^9$; $e'$, two revolving brushes running against two sides of the band $c^8$, to remove any surplus of powdered talc adhering to the band; $e^2$, rolls guiding and giving tension to a strip of tin-foil; $e^3$, a spool for tin-foil and a strip of tin-foil on it, and passing downward by the rolls $e^2$; $e^4$, a receiving-spool, upon which the band $c^8$ and the tin-foil $e^3$ are wound together, the purpose of the tin-foil being to keep the layers of the band $c^8$ from adhering together; $e^5$, a pulley on the shaft of the spool $e^4$; $e^6$, a belt running over the pulleys $a^8$ and $e^5$, (and shown in dotted lines,) giving motion to the spool $e^4$; $e^7$, main driving-belt running over pulley $a'$; $e^8$, pulverized talc in box $c^9$; $e^9$, upper side of band $c^8$ broken out to show the wires in it.

$i\ i'\ i^2\ i^3$ represent an arrangement of weights, levers, and fulcrums to press spool $c^5$ up against roll $c^7$ to wind the muslin smoothly on the spool. A similar arrangement is shown in connection with the upper spool, which takes up the upper strip of muslin, and is marked $i^4$; $i^5$, spools of wire; $i^6$, bar with openings for the wires to pass through $i^7$; $i^8$, clutch engaging the pulley $a'$; $i^9$, lever by which clutch $i^8$ is moved.

The several spools of wire, rubber, and graphite compound strips lined with muslin, tin-foil, and the receiving-spool having been properly placed, and the wire and rubber-compound strips being entered and conducted between and by the pressure-rolls, the machine will be moved slowly until the band $c^8$ has passed by the rollers $e$, through the box $c^9$, and joined with the tin-foil on the receiving-spool $e^4$, when the motion may proceed regularly, and the band $c^8$, will be deposited finished, ready for curing, on the receiving-spool. The spools $c^6$ and $e^4$, as well as $c^5$ and $e^3$, will have a capacity to run out a strip of the band $c^8$ as long as can be conveniently handled. These spools are arranged to be quickly removed and others put in their places when a length of the band is completed.

This machine is so constructed that it can be adapted to make a band of almost any number of wires required—the greater the number the wider the band; and the thickness of the band may also be increased or diminished as may be desirable.

I claim as new and my invention—

1. The above-described machine for inclosing telegraph-wires in a band of insulating material, consisting of a supporting-frame, driving-pulley, shaft and gears, pressure-rollers, spools, guide-bar, and guide-rolls for the wire, trimming-roll and cutters, box for powdered talc, and conducting-rolls, with levers, weights, and arms, and automatic arrangement for stopping the movement, all substantially as set forth.

2. In a machine for inclosing telegraph-wires in a band of insulating compound materials, in combination, the spools $c^5$, $c^6$, $e^3$ and $e^4$, the rolls $a^3\ a^4\ a^5\ a^9\ e\ e^2$, the pulleys $a^8\ e^5$, and the cutters $a^6$, all made and arranged in the machine in relation to it substantially as set forth, and for the purposes specified.

THOS. J. MAYALL.

Witnesses:
CHS. HOUGHTON,
H. KENNEY, Jr.